United States Patent [19]

Lim et al.

[11] 3,886,130

[45] May 27, 1975

[54] CATALYZED PRODUCTION OF HEAT STABLE FIBER-FORMING VINYL CHLORIDE

[75] Inventors: Drahoslav Lim; Miloslav Kolinsky; Vaclava Jisova, all of Prague, Czechoslovakia

[73] Assignee: Ceskoslovenska akademie ved No. 3 Narodni, Prague, Czechoslovakia

[22] Filed: June 29, 1972

[21] Appl. No.: 267,542

Related U.S. Application Data

[63] Continuation-in-part of Ser. No. 108,567, Jan. 21, 1971, abandoned.

[30] Foreign Application Priority Data

Jan. 21, 1970 Czechoslovakia .................... 440-70

[52] U.S. Cl. ........................ 260/92.8 R; 252/431 R
[51] Int. Cl. .............................................. C08f 1/42
[58] Field of Search ................................ 260/92.8 R

[56] References Cited
UNITED STATES PATENTS

| | | | |
|---|---|---|---|
| 3,076,794 | 2/1963 | Schnack et al ................. | 260/92.8 R |
| 3,108,993 | 10/1963 | Christman ...................... | 260/92.8 R |
| 3,162,621 | 12/1964 | Enk et al. .......................... | 260/82.5 |
| 3,196,137 | 7/1965 | Cain................................... | 260/93.7 |
| 3,278,508 | 10/1966 | Kahle et al........................ | 260/94.3 |
| 3,422,082 | 1/1969 | Vandenberg.................. | 260/92.8 R |
| 3,573,268 | 3/1971 | Carrega.......................... | 260/92.8 R |

*Primary Examiner*—Joseph L. Schofer
*Assistant Examiner*—John Kight
*Attorney, Agent, or Firm*—Murray Schaffer

[57] ABSTRACT

Method for the polymerization of vinyl chloride which is catalyzed by a lithium complex prepared by reacting alkyllithium with an organocompound of a metal(s) of Group IV or with an alkoxide of a metal of Groups I through III of the Periodic Table of Elements, preferably in the presence of an electron-donor. The polymerization is carried out at a temperature in a range of from about 20° C below zero to about 30° C above zero.

11 Claims, No Drawings

3,886,130

CATALYZED PRODUCTION OF HEAT STABLE FIBER-FORMING VINYL CHLORIDE

BACKGROUND OF THE INVENTION

This application is a continuation-in-part of co-pending application U.S. Ser. No. 108,567 filed Jan. 21, 1971, now abandoned.

The present invention relates to a method of catalytically preparing heat stable fiber-forming vinyl chloride polymers.

As is known, polyvinyl chloride obtained in a conventional process of radical polymerization of the emulsion, precipitate, or suspension type, has a relatively low heat stability; it softens at temperatures of about 65° C, and above 140° C it is liable to thermal degradation at a speed which depends, on the one hand, on the polymer purity and, on the other hand, on both the amount and the type of heat stabilizers added thereto to prevent it from being degraded. On the basis of extensive work it has been found that in this case it is not only the purity in the general sense of the word, i.e., the minimum amount of foreign matter contained therein, but also the structural regularity of the macromolecular chain that counts. The degradation process proceeds much quicker and begins at lower temperatures if the chain comprises weak links of a different or heterogeneous structure. A high degree of heat stability is desirable not only for conventional end uses but, particularly so for certain specific uses; thus, for instance in the building industry and in the manufacture or man-made fibers, polyvinyl chloride has hitherto not been used to any great extent, because of its low heat stability, although its mechanical strength and incombustibility substantially meet all of the necessary requirements in these areas.

The purpose of the present invention and the basic object of the same is to overcome the aforementioned disadvantages and to significantly improve the catalyzed production of heat-stable, fiber-forming vinyl chloride polymers.

SUMMARY OF THE INVENTION

In accordance with one feature of this invention, we provide a method for the catalytic production of heat-stable, fiber-forming vinyl chloride polymers, the method comprising the use of as catalyst a lithium complex prepared by reaction of alkyllithium with a compound which reduces both the metalation power and basicity of the alkyllithium used, such as an organo-compound of a metal of Group IV or an alkoxide of a metal of Group I through III of the Periodic Table of Elements, i.e., either of the pure compounds alone or with electrondonors, such as amines, alcohols, ethers, carbonyl and carboxyl compounds including heterocyclic substances such as pyridine and tetrahydrofuran, or various mixtures thereof, the mixture thereby formed being polymerized at a temperature in a range of from about 20°C below zero to about 30°C above zero.

DESCRIPTION OF THE PREFERRED EMBODIMENTS

In accordance with the method of the invention there is obtained highly heat-stable, fiber-forming vinyl chloride polymers wherein substantially all, that is, at least 99.9 per cent of the monomer is reacted at a temperature in a range of from about 20°C below zero to about 30°C above zero, with an alkyllithium complex the alkyl group of which contains from 2 to 16 carbon atoms and which is substantially completely pure, that is, at least 99.9 per cent pure with an organocompound of a high-valent metal selected from the metals of Group IV or with another organic compound which tends to reduce both the basicity and the metalation power of alkyllithium, such as, for example, an alkoxide of a metal of Groups I through Group III. Preferably, dicyclopentadientitanium dichloride, organo-tin and organo-lead which all are very heat stable in air can be used.

The catalyst is prepared preferably by allowing the two components, i.e., alkyllithium and the organo-compound of a high-valent metal of Group IV, or alkaxide of a metal of Groups I through III, to react in a small amount of an inert solvent, such as, for instance, an aliphatic or aromatic hydrocarbon, for example, hexane, cyclohexane, benzene, toluene and the like. The reaction medium may also include, preferably but not necessarily, the aforementioned electrondonors, such as amines, alcohols, ethers, carbonyl and carboxyl compounds including heterocylic substances, such as pyridine, tetrahydrofuran, or various mixtures thereof. The aforesaid solvents can be used also as diluents for the polymerization charge if it is desirable to obtain polymers of lower degrees of polymerization. The ratio of alkyllithium to the other components may vary between 0.1 : 1 and 20 : 1 and preferably between 0.2 : 1 and 5 : 1. The ratio of the complex to vinyl chloride, in turn, usually varies between $10^{-6}$ and $10^{-4}$.

As known from the literature in the art, the reaction of vinyl chloride with alkyllithium gives rise to low molecular weight polymers only and such polymers are practically unusable.

As far as is known, catalytic systems according to the present invention have not yet been utilized for the production of polyvinyl chloride and in view of the knowledge of the art they have not ever been thought to be efficient. Moreover, the possibility of obtaining in this manner vinyl chloride polymers of the high molecular weight and the outstanding heat stability as herein taught has been out of the question. Without any heat stabilizer additive the degradation of the product made in accordance with this invention begins at temperatures above 230° C. At the standard temperature used for examining the thermal degradation of conventional polyvinyl chloride types, i.e., 170° C, no traces of either mollification or even degradation can be found even after 5 hours exposure, while normal unstabilized polyvinylchloride undergoes decomposition at this temperature within 30 minutes.

Another advantage of the method according to the present invention resides in the fact that the polymerization process can be carried out at room temperature so that the required temperature can be maintained without any extra expense.

The relatively lower polymerization speed which is necessary to insure an even incorporation of monomeric units into the chain being formed permits a desirable heat removal during the reaction. A possible increase in prepration costs, due to the prolonged polymerization period is compensated for by the extraordinarily high quality of the final product. The polymerization process can be conducted in such a way that the polymer is continuously withdrawn and the catalyst and the monomer simultaneously supplied. The catalyst consumption is very low, since the catalytic centers formed during the initiation have a long lifetime, and their inactivation is negligible.

The molecular weight of the polymer depends on the monomer purity, and also on the purity of diluent, as well as on the activity of the catalyst, and on the polymerization temperature. Generally, the molecular weight amounts to more than 100,000 (calculated on the basis of the Danusso's empirical formula $[\eta] = 2.4 \times 10^{-4} \times M_n^{0.77}$.

Apart from high heat stability, fiber-forming capability and high molecular weight, the polymers obtained by using the method according to the invention are characterized by a considerable molecular wight selectivity.

The following examples are given as illustrative only, without, however, limiting the invention to the specific details thereof. In the examples, all parts and percents are by weight unless otherwise indicated. The molecular weights in all examples are calculated as number molecular weight ($M_n$). However, in Example I molecular weight ($M_w$) was measured by using light scattering methods in order to determine the breadth of molecular weight distribution defined as a ratio of $M_w/M_n$.

EXAMPLE I

Into a polymerization vessel which was evacuated and filled with argon, there were placed 156 grams of rectified vinyl chloride and 6 ml of a catalyst solution prepared by a 10 minute reaction of 0.01 gram of dicyclopentadienetitanium dichloride in 12 ml of benzene with 0.6 ml of 0.135 N solution of ethyllithium in benzene. The polymerization proceeded at 25°C. After 500 hours, the polymerization was stopped by means of water, the separated polymer washed through with distilled water and methanol and finally dried. The yield of the polymer amounted to 10.5 grams. The intrinsic viscosity measured at 25°C in cyclohexanone was 2.38 and the number molecular weight was $M_n$ = 160,000. The weight molecular weight was $M_w$ = 300,000 (measured by using light-scattering method). Ratio of $M_w/M_n$ = 1.3.

EXAMPLE II

The polymerization was carried out substantially as referred to in EXAMPLE I, except that 16 grams of vinyl chloride were mixed with 0.5 ml of a catalyst solution prepared in a 5 minute reaction of 0.025 gram of dicyclopentadienetitanium dichloride in 25 ml of benzene with 0.5 ml of 0.086 N solution of n-butyllithium in heptane. After 250 hours 1.254 grams of the polymer were obtained. The intrinsic viscosity measured as in EXAMPLE I was 2.25 and the molecular weight was 144,000.

EXAMPLE III

The process described in EXAMPLE I was repeated. 16.7 grams of vinyl chloride were mixed with 0.25 ml of a catalyst solution prepared in a 15 minute reaction of 0.021 grams of dicyclopentatienetitanium dichloride in 21 ml of benzene with 0.9 ml of 0.088 N solution of tertiary butyllithium in heptane. After 150 hours 1.404 grams of the polymer was obtained. The intrinsic viscosity was 2.33 and the molecular weight was 151,000.

EXAMPLE IV

The process set forth in EXAMPLE I was repeated except that 14.4 grams of vinyl chloride were mixed with 0.5 ml of a catalyst solution prepared in a 10 minute reaction of 0.028 gram of dicyclopentadienetitanium dichloride in 25 ml of a mixture of one part of tetrahydrofuran and 9 parts of benzene with 0.1 ml of 0.208 N solution of ethyllithium in benzene. After 140 hours, 0.841 gram of the polymer was obtained. The intrinsic viscosity was 2.06 and the molecular weight was 129,000.

EXAMPLE V

EXAMPLE I was repeated using 15.7 grams of vinyl chloride mixed with 8.5 ml of tetrahydrofuran and 0.75 ml of a catalyst solution prepared in a 5 minute reaction of dicyclopentadientitanium dichloride in 10 ml of tetrahydrofuran with 0.15 ml of 0.208 N solution of ethyllithium in benzene. After 1,000 hours, 3.275 grams of the polymer were obtained. The intrinsic viscosity was 0.43 and the molecular weight was 17,000.

EXAMPLE VI

The process set forth in EXAMPLE I was repeated except that 16.0 grams of vinyl chloride were mixed with 0.5 ml of a catalyst solution prepared in a 5 minute reaction of 0.010 gram of dicyclopentadientitanium dichloride together with 0.10 gram of tetraphenyltin in benzene with 1 ml of 0.88 N t-buyllithium. After 100 hours, 0.505 gram of the polymer was obtained. The intrinsic viscosity was 2.0 and the molecular weight was 124,000.

EXAMPLE VII

The process set forth in EXAMPLE I was repeated except that 325 grams of vinyl chloride were mixed with 10 ml of catalyst solution prepared in a 5 minute reaction of 0.0126 gram of dicyclopentadienetitanium dichloride in 12.6 ml of benzene with 0.25 ml of 0.68 N solution of tertiary butyllithium in benzene and the polymerization carried out at 30°C. After 720 hours, 33.76 grams of the polymer were obtained. The intrinsic viscosity was 1.77 and the molecular weight was 106,000.

EXAMPLE VIII

The process set forth in EXAMPLE I was repeated except that 13.5 grams of vinyl chloride were mixed with 12 ml of a catalyst solution prepared in a 5 minute reaction of 0.0204 gram of dicyclopentadienetitanium dichloride in 20.4 ml of benzene with 0.95 ml of 0.176 N solution of tertiary butyllithium of benzene. After 160 hours polymerization at 20°C, 0.57 gram of the polymer was obtained. The intrinsic viscosity was 1.35 and the molecular weight was 75,000.

EXAMPLE IX

Example I was repeated using 30.5 grams of vinyl chloride mixed with 1 ml of a catalyst solution prepared in a 15 minute reaction of 0.0311 gram of dicyclopentadienetitanium dichloride in 31.1 ml of benzene with one ml of 0.25 N solution of cetyllithium in cyclohexane. After 1,000 hours polymerization 20°C, 0.15 gram of the polymer was obtained. The intrinsic viscosity was 1.98 and the molecular weight was 122,000.

EXAMPLE X

The process set forth in EXAMPLE I was repeated except that 310 grams of vinyl chloride were mixed with 10 ml of a catalyst solution prepared in a 5 minute reaction of 0.01 gram of dicyclopentadienetitanium dichloride in 10 ml of a mixture 1 part of acetone and 10 parts of benzene with 0.25 ml of 0.68 N solution of tertiary butyllithium in benzene. After 720 hours polymerization at 15°C, 18.42 grams of the polymer were obtained. The intrinsic viscosity was 2.20 and the molecular weight was 124,000.

EXAMPLE XI

EXAMPLE I was repeated using 315 grams of vinyl chloride mixed with 10 ml of a catalyst solution prepared in a 5 minute reaction of 0.0119 gram of dicyclopentadienetitanium dichloride in 11.9 ml of a mixture of 1 part of ethyl acetate and 10 parts of benzene with 0.25 ml 0.68 N solution of tertiary butyllithium in benzene. After 720 hours polymerization at 15°C, 43.54 grams of the polymer were obtained. The intrinsic viscosity was 2.13 and the molecular weight was 134,000.

EXAMPLE XII

The process as referred to in EXAMPLE I was repeated except that 220 grams of vinyl chloride were mixed with 10 ml of catalyst prepared in a 5 minute reaction of 0.0116 gram of dicyclopentadienetitanium dichloride in 11.6 ml of a mixture of one part of diethylether and 10 parts of benzene with 0.25 ml of 0.68 N solution of tertiary butyllithium in benzene. After 720 hours at 15°C, 22,29 grams of the polymer was obtained. The intrinsic viscosity was 1.44 and the molecular weight was 81,000.

EXAMPLE XIII

EXAMPLE I was repeated except that 15.3 grams of vinyl chloride were mixed with 0.5 ml of a catalyst solution prepared in a 5 minute reaction of 0.021 gram of dicyclopentadienetitanium dichloride in 21 ml of a mixture of pyridine and benzene (1:40) with 0.6 ml of 0.26 N solution of tertiary butyllithium in benzene. After 140 hours polymerization at 25°C, 0.476 gram of the polymer was obtained. The intrinsic viscosity was 2.857 and the molecular weight was 197,000.

EXAMPLE XIV

The process set forth in EXAMPLE I was repeated except that 12.9 grams of vinyl chloride were mixed with 0.23 ml of a catalyst solution prepared in a 24 hour reaction of 0.021 gram of dicyclopentadienetitanium dichloride in 20 ml of benzene with 0.9 ml of 0.987 N solution of ethyllithium in benzene. After 250 hours polymerization at 10°C, 0.275 grams of the polymer was obtained. The intrinsic viscosity was 2.062 and the molecular weight was 129,000.

EXAMPLE XV

The process set forth in EXAMPLE I was repeated except that 32.0 grams of vinyl chloride were mixed with 0.5 ml of a catalyst solution prepared by dissolving of 0.14 gram of n-butyllithium complex and of lithium terc-buxoxide (1:1) in 5 ml of heptane. After 2 hours polymerization at 20°C, 0.05 gram of the polymer was obtained. The intrinsic viscosity was 0.333 and the molecular weight was 12,000.

EXAMPLE XVI

The process set forth in EXAMPLE I was repeated except that 31.0 grams of vinyl chloride were mixed with 0.1 ml of a catalyst solution prepared by dissolving a 5 gram of t-butyllithium and 5 grams of tetraethyl lead in 50 ml of heptane. After 20 hours polymerization at −20°C, 0.93 gram of the polymer was obtained. The intrinsic viscosity was 0.93 and the molecular weight was 46,000.

Various other modifications of the embodiments of this invention will be apparent to those skilled in the art. Therefore, it is to be understood that many variations of the invention may be made without departing from the spirit and scope thereof and the invention is not to be limited except as defined in the appended claims.

What is claimed is:

1. A method for preparing heat stable fiber forming vinyl chloride polymers comprising the steps of polymerizing monomeric vinyl chloride at a temperature in a range of from about −20°C to about +30°C in the presence of a lithium complex catalyst prepared by reacting an alkyl lithium compound, the alkyl group of which contains from 2 to 16 carbon atoms with at least one compound selected from the group consisting of organometal compounds of Group IV metals and alkoxide metal compounds of Group I through III metals of the Periodic Table of Elements which effects a decrease of basicity and metallation of said alkyl lithium compound.

2. The method as defined in claim 1 wherein the alkyl lithium is selected from the groups comprising ethyl lithium, butyl lithium and tertiary butyl lithium.

3. The method as defined in claim 1 wherein the organo metal compounds are compounds of titanium, tin, or lead.

4. The method as defined in claim 3 wherein the organo metal compound is dicyclopentadienetitanium dichloride.

5. The method as defined in claim 1 wherein the polymerization is carried out in the presence of an electron donor.

6. The method as defined in claim 5 wherein the electron donor is selected from the group consisting of amines, alcohols, ethers, carbonyl compounds, carboxyl compounds including heterocyclic substances and mixtures thereof.

7. The method as defined in claim 6 wherein the electron donor is diethylether.

8. The method as defined in claim 6 wherein the electron donor is acetone.

9. The method as defined in claim 6 wherein the electron donor is ethyl acetate.

10. The method as defined in claim 6 wherein the electron donor is pyridine.

11. The method as defined in claim 6 wherein the electron donor is tetrahydrofuran.

* * * * *